United States Patent

Shido et al.

[11] Patent Number: 6,147,958
[45] Date of Patent: Nov. 14, 2000

[54] INFORMATION RECORDING/ REPRODUCING APPARATUS AND METHOD USING PROBE

[75] Inventors: Shunichi Shido, Zama; Ryo Kuroda, Kawasaki, both of Japan

[73] Assignee: Canon Kabushiki Kaisha, Tokyo, Japan

[21] Appl. No.: 09/022,978

[22] Filed: Feb. 12, 1998

[30] Foreign Application Priority Data

Feb. 12, 1997 [JP] Japan ..................................... 9-042898

[51] Int. Cl.⁷ ....................................................... G11B 9/00
[52] U.S. Cl. ........................... 369/126; 250/306; 250/307
[58] Field of Search ..................................... 369/101, 126, 369/124; 250/306, 307

[56] References Cited

U.S. PATENT DOCUMENTS

| | | | |
|---|---|---|---|
| 5,222,060 | 6/1993 | Kuroda et al. | 369/126 |
| 5,282,191 | 1/1994 | Yamano et al. | 369/126 |
| 5,289,455 | 2/1994 | Kuroda et al. | 369/126 |
| 5,375,114 | 12/1994 | Hatanaka et al. | 369/101 X |
| 5,412,641 | 5/1995 | Shinjo et al. | 369/126 |
| 5,432,771 | 7/1995 | Shido et al. | 369/126 |
| 5,446,720 | 8/1995 | Oguchi et al. | 369/126 |
| 5,757,760 | 5/1998 | Shido et al. | 369/126 |
| 5,805,541 | 9/1998 | Takeda et al. | 369/126 |

FOREIGN PATENT DOCUMENTS

| | | |
|---|---|---|
| 63-161552 | 7/1988 | Japan . |
| 63-161553 | 7/1988 | Japan . |

OTHER PUBLICATIONS

Helvetica Physica Acta (1982), vol. 55, No. 6, pp. 726–735, "Scanning Tunneling Microscopy" by G. Binnig et al.

*Primary Examiner*—Paul W. Huber
*Attorney, Agent, or Firm*—Fitzpatrick, Cella, Harper & Scinto

[57] ABSTRACT

In an information recording/reproducing apparatus for effecting recording/reproduction of information using a probe, a recording bias is applied to between a recording medium and the probe to record information on the recording medium. A current flowing through the recording medium and the probe is detected. The detected current is determined whether it exceeds a predetermined value. When the detected current exceeds the predetermined value, the application of the recording bias is stopped after a predetermined time.

4 Claims, 5 Drawing Sheets

FIG. 5
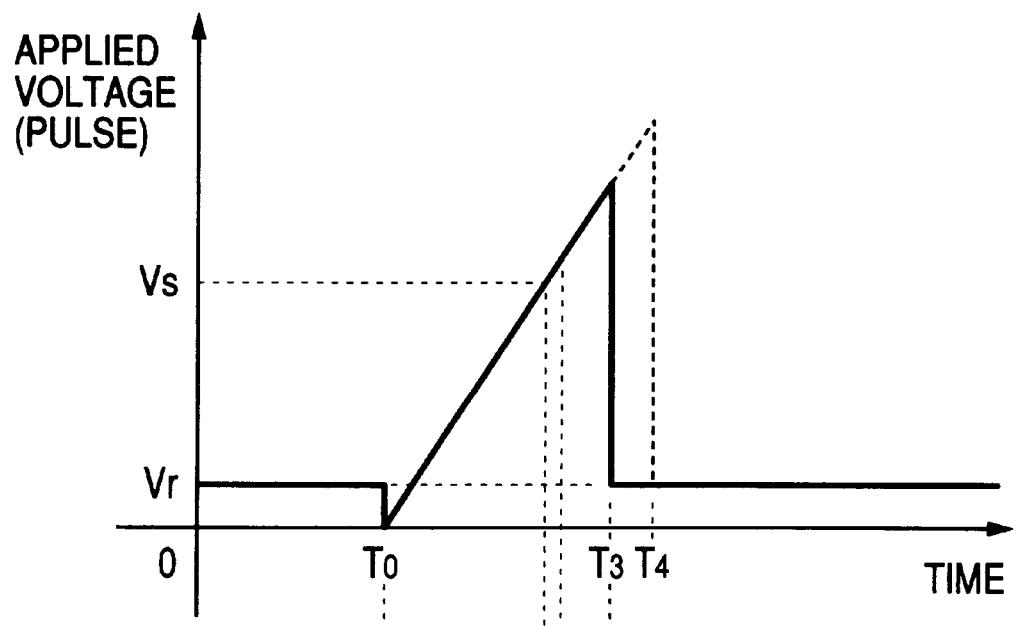
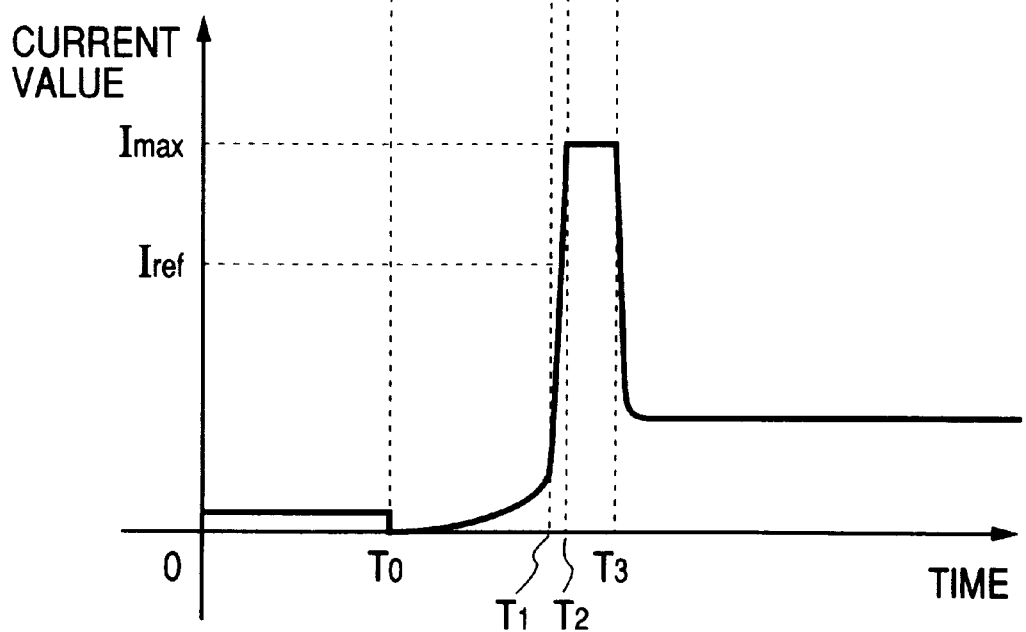

INFORMATION RECORDING/ REPRODUCING APPARATUS AND METHOD USING PROBE

BACKGROUND OF THE INVENTION

1. Field of the Invention

The present invention relates to an information recording/ reproducing apparatus using an electrical phenomenon caused by applying a voltage across a probe and a sample (recording medium) and bringing the probe and the sample close to each other and, more particularly, to a control system for controlling a current value flowing through the probe and the sample in recording.

2. Related Background Art

In recent years, a scanning tunnel microscope (to be referred to as an STM hereinafter) which allows the operator to directly observe the surface of a substance and an electronic structure near the surface by bringing a probe and a sample close to each other and using a physical phenomenon (tunnel phenomenon or the like) caused at that time has been developed [G. Binning et al., Helvetica Physica Acta, 55, 726 (1982)]. This STM enables measurement of a real spatial image at a high resolution regardless of a single-crystal or amorphous medium. The STM also realizes observation of a medium at a low power without damaging the medium by a current. The STM operates in not only ultra-high vacuum but also the atmosphere and a solution, and can be employed for various materials. The STM is expected to be widely applied in the academic field or the field of studies.

Also in the field of industries, the STM has recently received a great deal of attention because of its principle that the STM has a spatial resolution in atomic or molecular size. As disclosed in Japanese Laid-Open Patent Application Nos. 63-161552 and 63-161553, applications and practical use of the STM to an information recording/reproducing apparatus by using a recording layer in a medium are extensively being progressed.

In this information recording/reproducing apparatus, information is recorded by moving the probe to a designated point on the medium, applying a voltage (bias), displacing the recording medium from a high-resistance state to a low-resistance state, and writing a spot on the recording medium. For example, the low-resistance state is set as a bit ON state to allow to write binary information on the recording medium.

However, even after the recording medium is switched to a low-resistance state, an excess current flows for a long time because a bias is kept applied. As a result, Joule heat may be generated to destroy the film of the recording medium or the tip of the probe in some case.

The flow (flowing time and amount) of the current changes, so the bit size varies.

SUMMARY OF THE INVENTION

The present invention has been made to solve the conventional problems, and has as its object to provide an information recording/reproducing apparatus in which a recording medium and the tip of a probe are prevented from being destroyed, and the error rate can be decreased by controlling an excess current flowing through the recording medium.

To achieve the above object, according to the present invention, there is provided an information recording/ reproducing apparatus using a probe, comprising means for applying a recording bias across a recording medium and the probe in order to record information on the recording medium, means for detecting a current flowing through the recording medium and the probe, and means for determining whether the detected current exceeds a predetermined value, and when the detected current exceeds the predetermined value, stopping application of the recording bias after a predetermined time.

To achieve the above object, according to the present invention, there is provided an information recording/ reproducing method using a probe, comprising the steps of applying a recording bias across a recording medium and the probe in order to record information on the recording medium, detecting a current flowing through the recording medium and the probe, and determining whether the detected current exceeds a predetermined value, and when the detected current exceeds the predetermined value, stopping application of the recording bias after a predetermined time.

The present invention will be described in detail below in "DESCRIPTION OF THE PREFERRED EMBODIMENTS".

BRIEF DESCRIPTION OF THE DRAWINGS

FIG. 5 shows graphs of a voltage and a current waveform in recording in the use of the bias application circuit of the second embodiment.

DESCRIPTION OF THE PREFERRED EMBODIMENTS

According to the present invention, the potential of a probe and/or a recording medium is controlled to prevent the flowing time of a detected current equal to or larger than a current value set in advance from exceeding a time set in advance. With this control, an excess current is controlled not to flow through the recording medium, the recording medium and the tip of the probe are prevented from being destroyed, and the error rate can be decreased.

Preferred embodiments of the present invention will be described below.

First Embodiment

Figure 1:
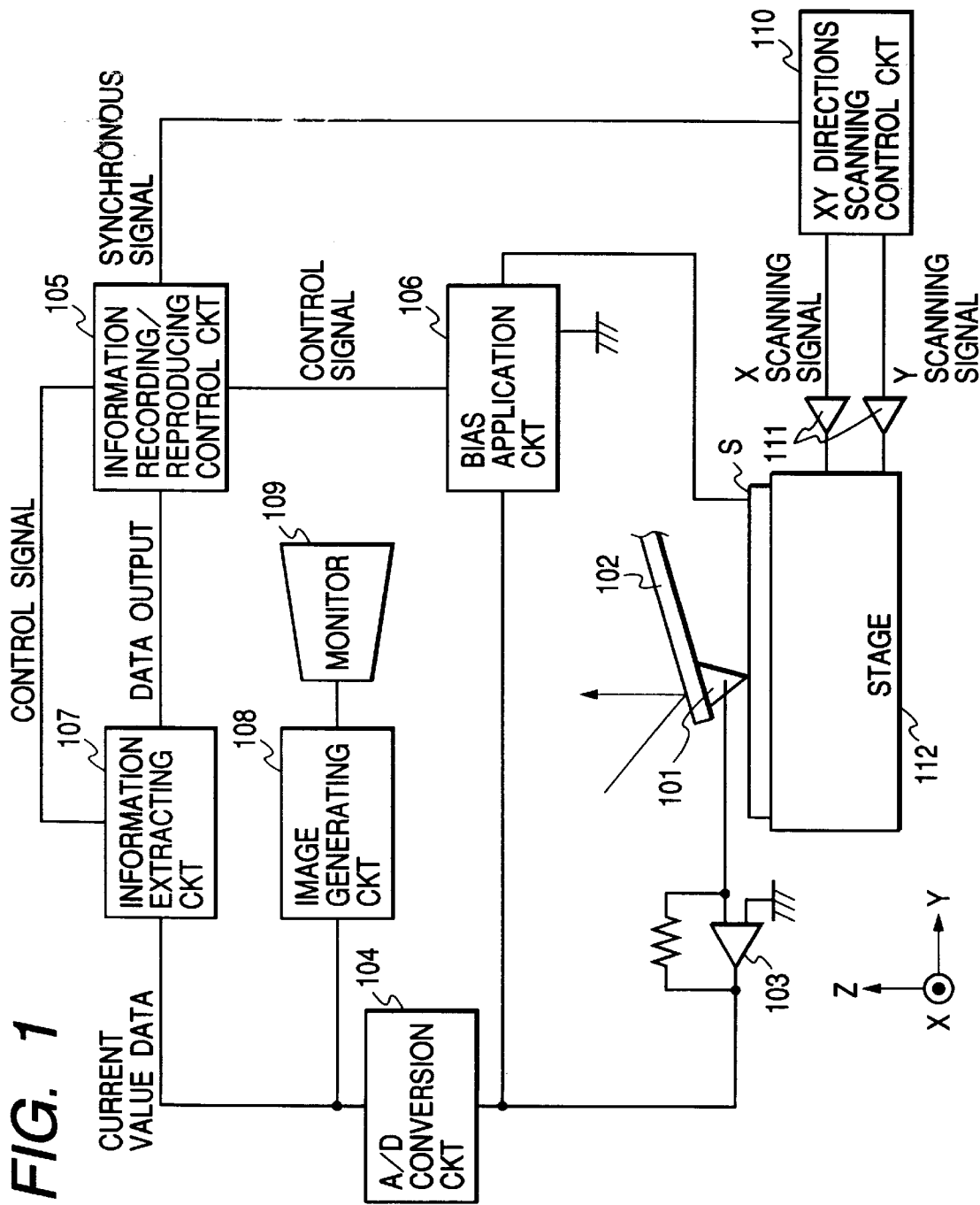
FIG. 1 is a block diagram showing the arrangement of the first embodiment of the present invention.

FIG. 1 shows the basic arrangement of the first embodiment in the present invention.

The basic arrangement comprises a recording medium substrate S, a probe 101 for recording/reproducing information, and a cantilever 102 which supports the probe.

In FIG. 1, the support portion of the cantilever is not illustrated. The basic arrangement comprises a mechanism (not shown) capable of AFM measurement using this cantilever.

Although this mechanism is necessary for mainly detecting contact between the probe and the substrate, the AFM also allows observation of corrugations on the surface of the substrate.

A recording/reproducing bias is applied to the recording medium substrate S by a bias application circuit 106 which is a feature of the present invention.

When the tip of the probe comes into contact with the medium at a certain pressure by the support of the AFM portion, and the bias application circuit 106 applies a bias, a current flows through the probe 101 and the recording medium substrate S.

This current is converted into a voltage signal by an I-V converter 103, and the voltage signal is sent to an A/D conversion circuit 104 and the bias application circuit 106.

The A/D-converted current value is sent to an image generating circuit 108 and an information extracting circuit 107. The data sent to the image generating circuit 108 is output as a current image to a monitor.

Under control of an information recording/reproducing control circuit 105, information is read from the current value data sent to the information extracting circuit 107, and output.

The information recording/reproducing control circuit 105 controls the bias application circuit 106, an XY directions scanning control circuit 110, and the information extracting circuit 107.

The XY directions scanning control circuit 110 outputs driving signals for moving a stage 112 in the X and Y directions in response to an instruction from the information recording/reproducing control circuit 105.

The driving signals are adjusted in magnitude by amplifiers 111, and drive a piezoelectric actuator serving as an actuator within the stage.

The stage 112 is driven in the X and Y directions in order to move the tip of the probe 101 to an arbitrary point on the medium surface, similar to a conventional STM.

The operation of the bias application circuit 106 will be described with reference to FIGS. 2 and 3.

The medium used in this embodiment is a polyimide medium as an organic polymer medium having a π electron conjugate system.

Polyimide films are built up on the surface of an Au flat electrode by the Langmuir-Blodgett technique (to be referred to as the LB technique hereinafter) to form a recording layer.

This embodiment employs a recording layer made of a six-layered polyimide LB films. Information is recorded by applying a voltage to this film using the probe.

In this case, the thickness of the recording layer is considered to be 2 to 3 nm. The same electrical state is difficult to realize within the film even by applying the same bias because the film thickness slightly varies.

That is, a voltage for switching the medium to a low-resistance state varies.

Accordingly, in a practical system, a voltage high enough to record information even with slight variations in film thickness is applied not to decrease the recording probability.

However, at a portion where the state is switched by a low bias, the bias is kept applied for a long time even after a low-resistance state is attained. During this period, a large current flows to thermally destroy the film.

The film portion is destroyed by bias application. To the contrary, a small charge amount flowing in bit formation results in a small bit diameter. Even if a bias higher than a given threshold voltage is applied in recording, a bit is formed though its diameter or the like is very small. Tracking must be strongly controlled.

In the present invention, therefore, the total charge amount flowing through the film is adjusted to a certain degree by controlling the current application time, the load on control is further reduced by adjusting the bit diameter to a proper size in accordance with the shape of the tip of the probe, and high-efficiency recording/reproduction is realized.

Figure 2:
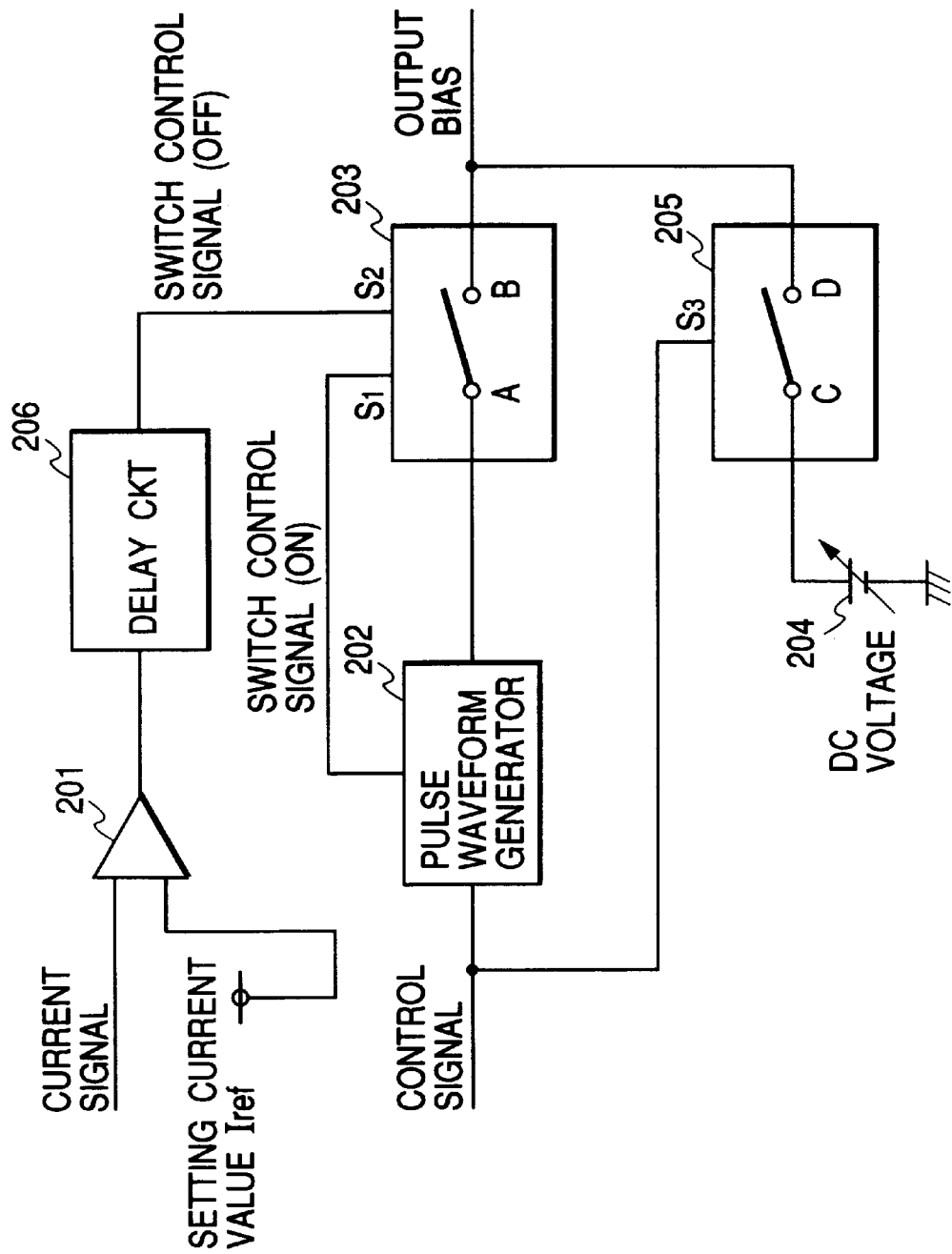
FIG. 2 is a block diagram showing the arrangement of a bias application circuit in the first embodiment.

FIG. 2 shows the bias application circuit for preventing the above phenomena.

This bias application circuit monitors a current value and switches a bias. The monitored current value is converted into a voltage value by the I-V converter 103 in FIG. 1, and the voltage value is sent to the bias application circuit 106.

In the bias application circuit, a comparator 201 compares the sent current value with a setting current value $I_{ref}$ set in advance. If the current value exceeds the setting current value $I_{ref}$, a signal is sent to a switch 203 after being delayed by a delay circuit 206 by a predetermined time. Note that the setting current value $I_{ref}$ is set in accordance with the magnitude of a voltage.

The setting current value $I_{ref}$ and the delay time may be fixed in advance or changed by an external instruction.

A pulse waveform generator 202 outputs a recording voltage pulse upon reception of a control signal from the information recording/reproducing control circuit 105 in FIG. 1.

Figure 3:
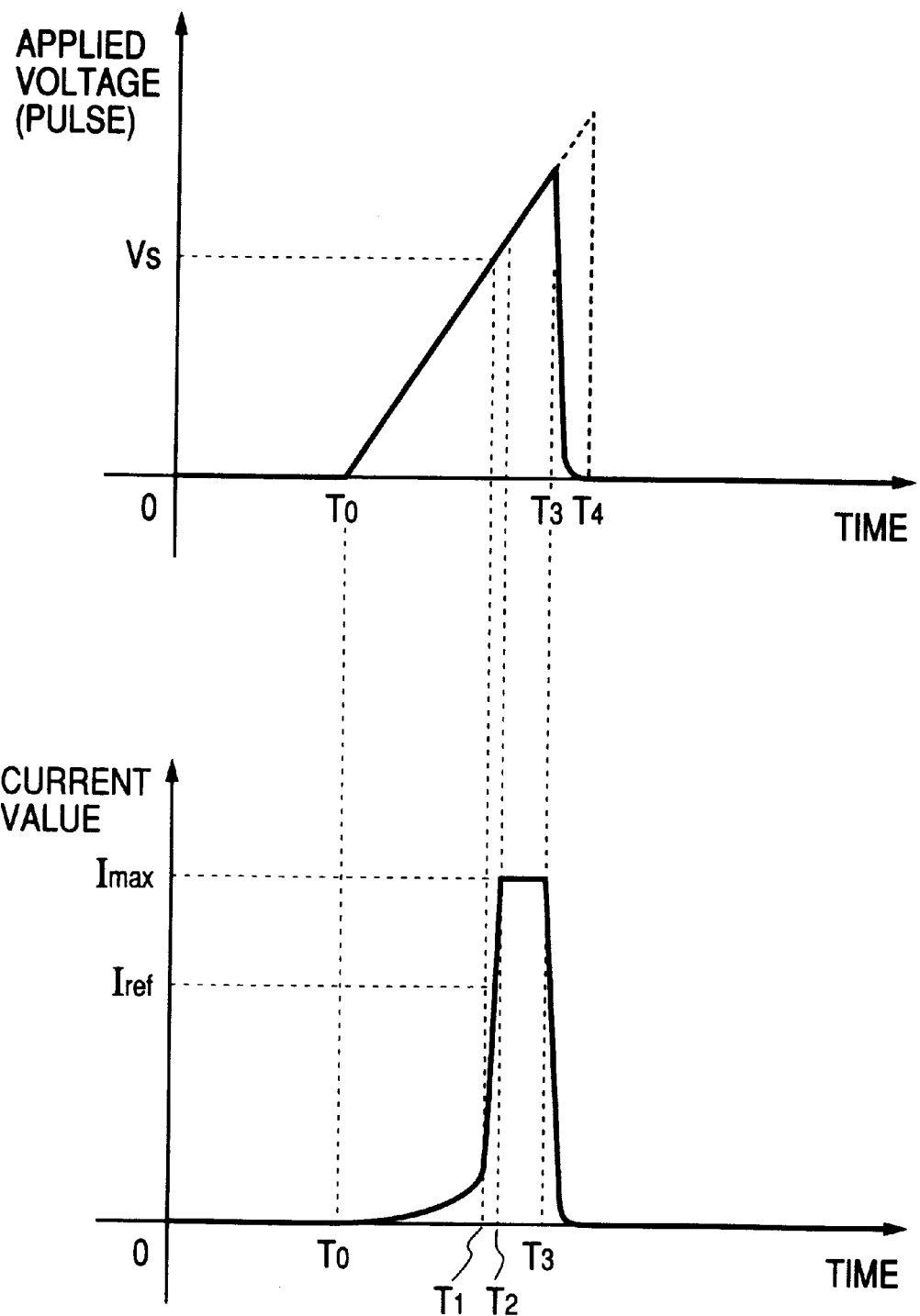
FIG. 3 shows graphs of a voltage and a current waveform in recording in the use of the bias application circuit of the first embodiment.

The pulse waveform generator 202 outputs a ramp wave like the one indicated by the dotted line in the upper graph of FIG. 3. At the same time, the pulse waveform generator 202 sends a trigger signal to the switch 203.

The pulse signal is sent to terminal A of the switch 203. The switch 203 operates to connect terminals A and B upon reception of a trigger to S1 and disconnect them upon reception of a trigger to S2.

In reproduction or observation, a switch 205 is turned on by a control signal from the information recording/reproducing control circuit 105, thereby outputting a DC voltage to the substrate.

At this time, since no recording pulse is required, the switch 203 is kept off (the switch 203 is always off except for pulse application).

A recording operation using pulse application will be explained with reference to FIG. 3.

The solid line in the upper graph of FIG. 3 represents a voltage waveform practically applied to the medium, and the solid line in the lower graph represents a current flowing at that time. Note that the following description is not directed to a reproducing operation, the switch 205 is kept off, and no DC bias is applied.

When generation of a pulse is instructed by a control signal, the pulse waveform generator 202 in FIG. 2 starts outputting a ramp wave at time T0.

At the same time, a trigger signal is sent to the switch 203 in FIG. 2 to turn on the switch 203.

Thereafter, the current value gradually increases. At time T1, i.e., when the voltage reaches $V_s$, the medium is switched to a low-resistance state.

As shown in FIG. 3, the current abruptly increases with a given time constant determined by a resistance value. When the current value reaches $I_{ref}$ (time T2), the comparator 201 in FIG. 2 sends a trigger signal to the delay circuit 206.

The delay circuit 206 sends a switch control signal (OFF) to S2 of the switch 203 at time T3 upon the lapse of a predetermined time from the reception time (T2).

The switch is turned off, and the pulse waveform generator 202 continuously applies a bias until time T3, as represented by the broken line. The bias of the recording medium substrate drops to the ground level with the time constant determined by the resistance value of the medium.

In response to this drop, the current value also abruptly decreases to level "0". The medium holds a low resistance in this state, and one cycle of bit recording is completed.

During the series of operations, no scanning in the X and Y directions is performed. These operations are performed at a certain point on the medium.

Since $I_{max}$ in FIG. 3 is the saturation value of an output from the detection system, a higher current value cannot be measured.

When this mechanism was used for practical information recording/reproduction, no medium was destroyed by a current. Since variations in bit shape fell within the range of a diameter of 10 nm±1 nm, the error rate greatly decreased.

This embodiment employs a ramp wave as a recording pulse, but another wave such as a triangular or rectangular wave can be used in accordance with the properties of a medium.

Second Embodiment

The second embodiment of the present invention will be described with reference to FIGS. 4 and 5.

Figure 4:
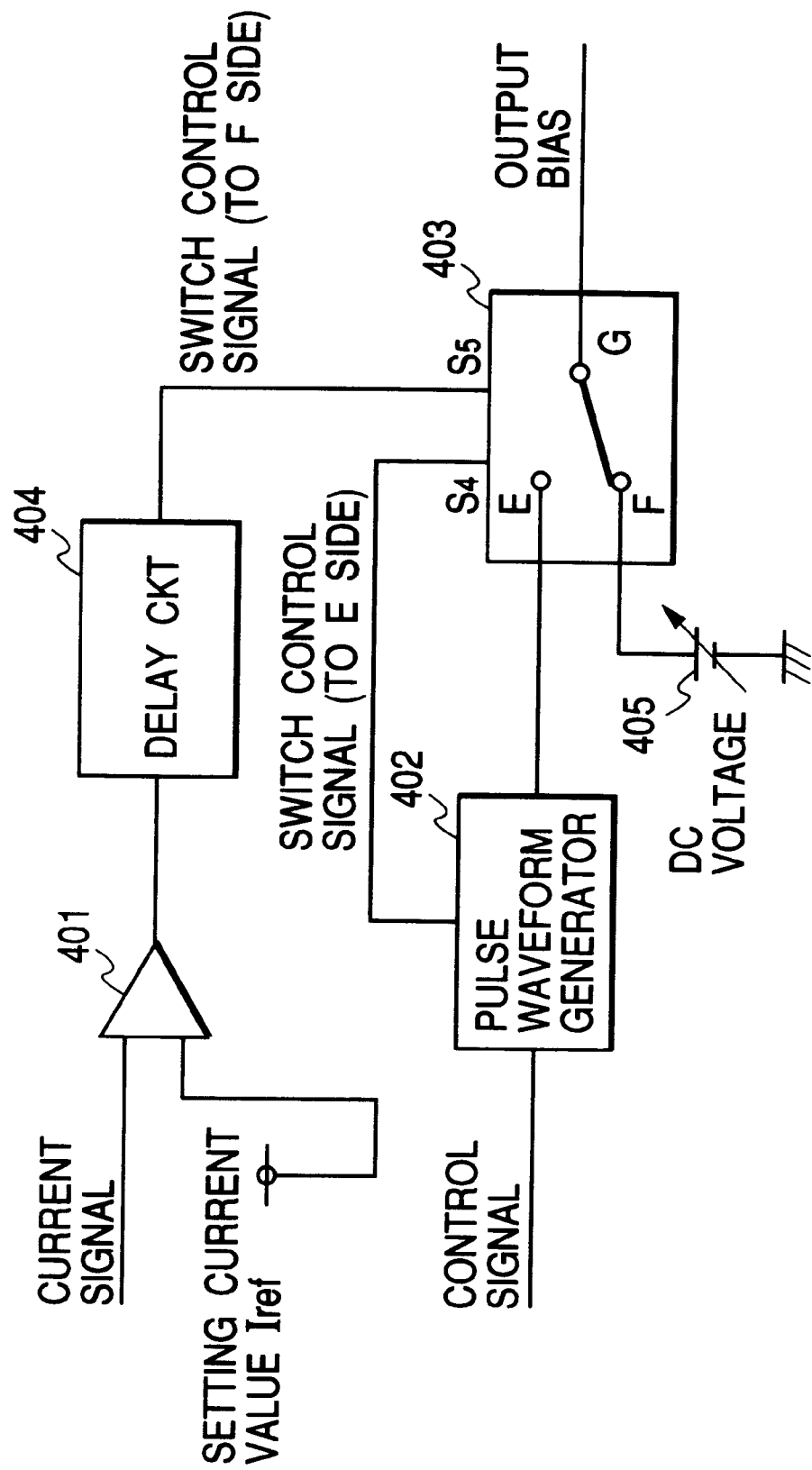
FIG. 4 is a block diagram showing the arrangement of the bias application circuit in the second embodiment.

In the arrangement of FIG. 1, a bias circuit having an arrangement shown in FIG. 4 is used. A comparator 401 compares a current signal with the setting current value $I_{ref}$, and immediately after the magnitude of the current signal exceeds $I_{ref}$, sends a signal to a delay circuit 404.

The delay circuit 404 sends a signal to a control input S5 of an analog switch 403 upon the lapse of a delay time set in advance.

A pulse waveform generator 402 generates a pulse upon reception of a control signal from the information recording/reproducing control circuit 105 (FIG. 1). At the same time as the pulse, the pulse waveform generator 402 outputs a trigger signal.

The pulse is input to terminal E of the switch 403, whereas the trigger is input to a control input S4 of the switch 403.

A voltage 405 outputs a DC bias $V_r$ for reproduction or observation, and is connected to terminal F of the switch 403.

The switch 403 will be explained below.

The switch 403 comprises two analog signal input terminals (E and F), one analog output terminal (G), and two control signal input terminals (S4 and S5).

The switch 403 operates to change its connection upon reception of an input to S4 or S5. When a trigger pulse is input to S4, the switch 403 detects the leading edge of the trigger pulse to connect terminal G to terminal E. When a trigger pulse is input to S5, the switch 403 detects the leading edge of the trigger pulse to connect terminal G to terminal F.

In the second embodiment, the switch 403 is fabricated using a semiconductor logic circuit, similar to an analog switch using a semiconductor.

The whole operation will be described with reference to FIG. 5.

The upper and lower graphs of FIG. 5 respectively represent a bias applied to the recording medium substrate (S in FIG. 1), and a current value flowing through the probe (101) and the recording medium substrate that are monitored by the I-V converter (103).

In the second embodiment, similar to the first embodiment, an Au electrode is used as a substrate electrode, and a six-layered polyimide LB film stacked on the Au surface is used as a recording layer.

Before time T0, terminal G of the switch is connected to F side, and the voltage $V_r$ is applied to the medium substrate (S in FIG. 1).

At this time, a certain current flows owing to this voltage. This signal is a reproducing or observation signal, which varies in response to corrugations on the medium surface, changes in conductivity of the medium, local changes in LB film thickness of the medium, or the like.

At time T0, the pulse waveform generator (402) outputs a trigger pulse as a switch control signal, and at the same time outputs a medium application voltage pulse. The trigger pulse connects terminal G of the switch 403 to E side to electrically connect the pulse generator and the recording medium substrate.

The second embodiment employs a ramp wave as the pulse signal. As the bias gradually increases, a current starts flowing. When the voltage reaches $V_s$, the medium is switched to a low-resistance state (T1).

As a result, the current abruptly increases. Immediately after the current value exceeds $I_{ref}$(T2), the comparator 401 outputs a trigger signal to the delay circuit 404.

The delay circuit outputs a switch control signal at time T3 upon the lapse of a predetermined time to connect terminal G of the switch 403 to F side again. An output from the pulse waveform generator 402 increases the bias until time T4, while the voltage of the recording medium substrate returns to the application state of the DC bias $V_r$.

The resistance of the medium is held even after the voltage drops, and one cycle of recording on the medium is completed.

During the series of operations, no scanning in the X and Y directions is performed. Since $I_{max}$ in FIG. 5 is the saturation value of an output from the detection system, a higher current value cannot be measured.

When this mechanism was used for practical information recording/reproduction, no medium was destroyed by a current. Variations in shape of a formed bit fell within the range of 10 nm±1 nm.

Consequently, the error rate greatly decreased.

This embodiment employs a ramp wave as a recording pulse, but another wave such as a triangular or rectangular wave can be used in accordance with the properties of a medium. By setting $I_{ref}$ in accordance with a medium, this mechanism can be easily applied to various media. Although the bias is applied to only the medium side in this embodiment, the bias may be applied to the probe side or both of the probe and medium sides as far as a voltage can be applied across the probe and the medium substrate.

What is claimed is:

1. An information recording/reproducing apparatus using a probe, comprising:

means for applying a recording bias across a recording medium and said probe in order to record information on said recording medium;

means for detecting a current flowing through said recording medium and said probe; and means for determining whether the current detected during the application of a recording bias exceeds a predetermined value, and when the detected current exceeds the predetermined value, stopping application of the recording bias after a predetermined time.

2. An apparatus according to claim 1, wherein said stop means applies a reproducing bias across said recording medium and said probe after stopping application of the recording bias.

3. An apparatus according to claim 1, wherein said stop means applies a bias of ground level across said recording medium and said probe after stopping application of the recording bias.

4. An information recording/reproducing method using a probe, comprising the steps of:

applying a recording bias across a recording medium and said probe in order to record information on said recording medium;

detecting a current flowing through said recording medium and said probe during the application of a recording bias; and determining whether the detected current exceeds a predetermined value, and when the detected current exceeds the predetermined value, stopping application of the recording bias after a predetermined time.

* * * * *